(12) United States Patent
Amano

(10) Patent No.: US 7,366,480 B2
(45) Date of Patent: Apr. 29, 2008

(54) RADIO COMMUNICATION DEVICE

(75) Inventor: Yoshihisa Amano, Nara (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 330 days.

(21) Appl. No.: 10/963,734

(22) Filed: Oct. 14, 2004

(65) Prior Publication Data

US 2005/0085196 A1 Apr. 21, 2005

(30) Foreign Application Priority Data

Oct. 15, 2003 (JP) .......................... P2003-355038

(51) Int. Cl.
*H04B 1/02* (2006.01)
*H04M 1/00* (2006.01)
(52) U.S. Cl. .................... 455/101; 455/104; 455/575.7
(58) Field of Classification Search ............... 455/101, 455/78, 575.7, 129, 91, 102, 104, 130, 132, 455/561, 562.1; 375/267, 284, 285
See application file for complete search history.

(56) References Cited

U.S. PATENT DOCUMENTS

| | | | |
|---|---|---|---|
| 6,760,388 B2 * | 7/2004 | Ketchum et al. ........... 375/295 |
| 6,952,454 B1 * | 10/2005 | Jalali et al. ................. 375/260 |
| 7,068,981 B2 * | 6/2006 | Sim ............................ 455/101 |
| 7,133,646 B1 * | 11/2006 | Miao ........................... 455/73 |
| 7,139,328 B2 * | 11/2006 | Thomas et al. ............. 375/299 |
| 2004/0081131 A1 * | 4/2004 | Walton et al. .............. 370/344 |
| 2004/0234012 A1 * | 11/2004 | Rooyen ...................... 375/347 |
| 2005/0197078 A1 * | 9/2005 | Yoshimoto ............... 455/127.4 |
| 2005/0233752 A1 * | 10/2005 | Laroia et al. ............... 455/450 |
| 2006/0222100 A1 * | 10/2006 | Behzad ....................... 375/267 |
| 2006/0223483 A1 * | 10/2006 | Behzad ....................... 455/323 |

FOREIGN PATENT DOCUMENTS

| JP | 9-149090 A | 6/1997 |
|---|---|---|
| JP | 2000-68958 A | 3/2000 |

OTHER PUBLICATIONS

Spatial power combining for high-power transmitters Harvey, J.; Brown, E.R.; Rutledge, D.B.; York, R.A.; Microwave Magazine, IEEE vol. 1, Issue 4, Dec. 2000 pp. 48-59.*

(Continued)

*Primary Examiner*—Sonny Trinh
(74) *Attorney, Agent, or Firm*—Birch, Stewart, Kolasch & Birch, LLP

(57) ABSTRACT

In the radio communication device of the present invention, a first carrier transmission modulation wave outputted from a first signal generator 101 is amplified by a first power amplifier 103 and transmitted from a first antenna element 107 through a first duplexer 105. A second carrier transmission modulation wave outputted from a second signal generator 102 is amplified by a second power amplifier 104 and transmitted from a second antenna element 108 through a second duplexer 106. Then, transmission modulation waves with the first and second carriers are subjected to spatial power combining after being transmitted from the two antenna elements 107 and 108 that permit diversity reception. As a result, the radio communication device, which uses two or more carriers (carrier waves), can achieve highly efficient power amplification with a small-sized low-cost circuit means.

6 Claims, 7 Drawing Sheets

OTHER PUBLICATIONS

K. Higuchi et al., Overview of Experiment System of Broadband Wireless Access, Institute of Electronics, Information and Communication Engineers 2003, p. 531.

T. Kawamura et al., Experiments on throughout performance for multicarrier/ DS-CDMA broadband wireless access in reverse link, Institute of Electronics, Information and Communication Engineers 2003, p. 536.

University of California, Los Angeles MIMO Wireless Communications Research. Non-Engineer's Intro to MIMO & OFDM [online], [retrieved on Oct. 29, 2007]. Retrived from the Internet: < URL: http:/www.mimo.ucla.edu/summaries/INTRO_MIMO &OFDM.pdf>.

* cited by examiner

RADIO COMMUNICATION DEVICE

This Nonprovisional application claims priority under 35 U.S.C. §119(a) on Patent Application No. P2003-355038 filed in Japan on Oct. 15, 2003, the entire contents of which are hereby incorporated by reference.

BACKGROUND OF THE INVENTION

The present invention relates to radio communication devices and relates, in particular, to a radio communication device such as a portable telephone that uses a highly efficient power amplification method in which a multi-carrier signal using a small number of, in particular, about two to three carriers (carrier waves) serves as a transmission modulation wave.

The portable telephones, which have continued achieving remarkable technological progress in recent years, have advanced through the sequential steps of the first generation (analog portable telephone), the second generation (digital portable telephone) and the third generation (IMT-2000) in the past. Then, at the present, the standardization work and the researches and development of the next fourth generation (Beyond IMT-2000) have already started aiming at the practical use in the year of about 2010.

The construction of the RF (radio frequency) circuit of a radio communication device is influenced by the RF electric signal modulation system provided by the standard of the radio communication system. Although the standardization work of the fourth generation has not yet been advanced, a MC/DS-CDMA (Multi Carrier/Direct Spread-Code Division Multiple Access) system recommended by NTT DoCoMo Inc. is regarded as promising as the modulation system of uplink (communication from a portable telephone to the base station (sometimes called the "Upward link", "Reverse Link" or the like)).

This MC/DS-CDMA system is disclosed in, for example, the Paper No. B-5-72 "Outline of the broadband radio access experiment device" at the general meeting of The Institute of Electronics, Information and Communication Engineers held in 2003 and likewise in the Paper No. B-5-77 "Indoor experiment result of the throughput characteristic in upward link multi-carrier/DS-CDMA broadband radio access" and so on. According to Table 2 in the document B-5-72 and Table 1 in the document B-5-77, it can be understood that a modulation signal of a occupancy bandwidth of 40 MHz in total is provided by arranging two carriers of a DS-CDMA signal (direct sequence code division multiple access signal) of a bandwidth of 20 MHz per carrier (carrier wave) on the frequency axis. FIG. 5 shows this in a schematic spectrograph. A modulation wave 501 due to a first carrier and a modulation wave 502 due to a second carrier are adjacently arranged on the frequency axis. In the aforementioned MC/DS-CDMA system, each of the two carriers is a modulation wave of a bandwidth of 20 MHz, and the two carriers occupy a total bandwidth of 40 MHz.

As described above, the MC/DS-CDMA system uses a multi-carrier signal that has a plurality of carriers although the number of the carriers is only two. Moreover, it can be understood that linear amplification is required since each of the carriers is a DS-CDMA signal.

Moreover, FIG. 1 (2) in the aforementioned document B-5-72 shows a schematic block diagram of the radio communication terminal at which this MC/DS-CDMA system is used as a transmission modulation system. FIG. 7 of the present specification shows a diagram obtained by rearranging the diagram in this document by eliminating the portions unnecessary for the explanation of the present invention.

In FIG. 7, a transmission modulation wave generated by a signal generator 701 is processed (subjected to amplification, frequency conversion, band limiting and so on) by a transmitter circuit 702 and transmitted from an antenna element 704 or an antenna element 705 through a TX amplifier and a duplexer 703. Conversely, a reception modulation wave received by the antenna element 704 or the antenna element 705 is processed (subjected to amplification, frequency conversion, unnecessary frequency component removal and so on) by a receiver circuit 706 through a RX amplifier circuit and a duplexer 703 and demodulated in a demodulator 707.

In the radio communication terminal of a portable telephone or the like, the power consumption of the TX amplifier used immediately before the antenna of the transmission system, i.e., a power amplifier is an extremely serious problem. The power amplifier is a circuit that operates to amplify the modulation signal of a minute electric power on the milliwatt order produced in the signal processing section to a high power on the watt order at a stroke and send the resulting power to the transmission antenna. In general, the power amplifier, which handles the high power on the watt order, therefore becomes a part of markedly great power consumption among all the electronic parts. Therefore, it becomes extremely important to reduce the power consumption and increase the efficiency of particularly the power amplifier for the purpose of reducing the power consumption of the radio communication terminal.

If the efficiency of the power amplifier is high, the continuous duration of telephone conversation of the portable telephone can be made long with respect to the battery of the same capacity. Moreover, if a margin is consequently produced in the continuous duration of telephone conversation, the capacity of the battery can be reduced, and the portable telephone is allowed to totally have a light weight, a small size and a low cost. As described above, increasing the efficiency of the power amplifier is the serious matter directly connected to the marketability and the convenience of the portable telephone.

As the circuit configuration of a power amplifier for a multi-carrier signal as in FIG. 5, there are known the two methods of the "collective amplification system" shown in FIG. 8 and the "individual amplification system" shown in FIG. 9. A difference between the collective amplification system and the individual amplification system is described in detail in, for example, the "prior art" section of JP 2000-68958 A.

FIG. 8, which shows the collective amplification system, is obtained by rearranging FIG. 12 of the aforementioned first patent document by eliminating the portions that are not related to the essence of the present invention. A plurality of carriers (carrier waves) individually generated by a plurality of signal generators 801 through 804 are first bundled into one signal line first by a combiner 805, collectively amplified by a power amplifier 806 and transmitted from an antenna element 807. The collective amplification system is the system generally adopted by the home electric appliances since the circuit configuration is simple, small-sized and low cost. For example, in a wireless LAN product of the IEEE802.11a Standard for personal computers, an OFDM signal, which is a typical multi-carrier signal, is amplified by the collective amplification system.

However, when the multi-carrier signal is amplified by the collective amplification system, there is a widely known problem that the efficiency of the power amplifier is significantly deteriorated and the power consumption increases. This is ascribed to the fact that the plurality of carriers are momentarily mutually combined to intensify or conversely canceled to weaken and the amplitude fluctuation of the signals consequently becomes remarkable. This problem is described in many documents including, for example, the "prior art" section of JP 09-149090 A.

Therefore, it is also attempted to use the individual amplification system of FIG. 9 in place of the collective amplification system of FIG. 8 in order to improve the efficiency of the power amplifier. FIG. 9, which shows the individual amplification system, is obtained by rearranging FIG. 11 of the aforementioned first patent document by eliminating the portions that are not related to the essence of the present invention. A plurality of carriers (carrier waves) individually generated by a plurality of signal generators 901 through 904 are individually amplified as they are by a plurality of power amplifiers 905 through 908 and subsequently bundled into one multi-carrier signal by a power combiner 913. The power combiner 913 is concretely provided by isolator circuits 909 through 912, a resistance matching circuit or the like for preventing the interference between the power amplifiers 905 through 908 due to signal reflection. Then, the multi-carrier signal, which is obtained by combining the electric powers, is transmitted from an antenna element 914.

The individual amplification system as in FIG. 9 is considered to have the possibility of increasing the efficiency of the power amplifier in comparison with the collective amplification system as in FIG. 8. The above is because the amplitude fluctuation is suppressed low in the individual amplification system (FIG. 9) since the signals are mere single-carrier signals when the signals pass through the individual amplifiers 905 through 908 even though the final output is a multi-carrier signal.

However, there have been several technical problems in actually achieving the individual amplification system (FIG. 9) at the home electric appliance level, and above all, a big problem has been the combiner. For example, in the case of the power combiner 913 of FIG. 9, there cannot be avoided increases in size and cost due to the use of a number of isolator parts and a power loss due to resistors. In particular, the loss due to the resistors means that the power amplified with effort is partially uselessly consumed even though the power amplifiers 905 through 908 can achieve highly efficient amplification, and this might conversely lead to an increase in the power consumption after all.

The reason why the circuit generating a loss due to the resistors must be used as the combiner 913 is that the multi-carrier signal (FIG. 5) supposed by the present invention is the signal in the unfavorable conditions in which the two carriers 501 and 502 are adjacent to each other without any guardband on the frequency axis. There is a known means that can achieve power combining in a loss-less manner while preventing the mutual interference by securing isolation between terminals if a guardband exists between the two carriers 501 and 502 and their frequency bands are separated apart from each other. For example, the duplexer circuit is the typical example of the loss-less combiner in such the favorable conditions. However, in the case of the unfavorable conditions in which almost no guardband exists as in FIG. 5, there is known no implementation method for achieving the loss-less combiner that can easily be provided on a circuit board.

As a prior art countermeasure against this problem, for example, the aforementioned first patent document insists that the isolator circuits 909 through 912 of the power combiner 913 of FIG. 9 can be eliminated by using a variable filter circuit or in a similar manner. However, even this first patent document cannot propose a means for achieving the loss-less configuration of the matching circuit that employs resistors located next to the isolator circuits.

As described above, since the power combiner 913 is required to meet the intense demand, it has been practically difficult to provide the individual amplification system (FIG. 9).

SUMMARY OF THE INVENTION

The object of the present invention is to provide a small-sized lightweight radio communication terminal capable of permitting long-time telephone conversation in a radio communication system that uses a multi-carrier signal or in, for example, a portable telephone of the "fourth generation".

The object of the present invention for solving the problems is to provide a small-sized low-cost radio communication device capable of achieving power combining with a small loss after carrying out high-efficiency power amplification of a multi-carrier signal carrier-by-carrier by means of the individual amplification system.

In order to achieve the above object, there is provided a radio communication device having M (M: natural number being not smaller than two) antenna elements, M signal generators, M power amplifiers and M duplexers, adopting a frequency division duplex operation system and using a multi-carrier signal that uses M carriers of different center frequencies as a transmission modulation wave, wherein
  a transmission modulation wave with an N-th (N=1, . . . , M) carrier outputted from the N-th signal generator is amplified by the N-th power amplifier and transmitted from the N-th antenna element through the N-th duplexer, whereby transmission modulation waves with a total of M carriers including the first through M-th carriers are outputted from the respective M antenna elements.

Here, the frequency division duplex operation system is a communication system in which transmission and reception are simultaneously performed using two waves having different frequencies.

According to the radio communication device of the above-mentioned construction, the M antenna elements can generally be arranged so that the mutual electromagnetic coupling is reduced. Therefore, the M carrier transmission modulation waves transmitted from the M antenna elements are smoothly sent into the space without entering the other antennas through electromagnetic coupling. As a result, power combining can be achieved without causing any loss. Moreover, this is achieved without significantly increasing the number of parts and cost. Therefore, a radio communication terminal capable of achieving a great improvement in the efficiency of the power amplifier and having low power consumption can be provided. Moreover, the increase in the number of parts and cost can be minimized.

Also, there is provided a radio communication device having M (M: natural number being not smaller than two) antenna elements, M signal generators, M power amplifiers and M transmission/reception changeover switch circuits, adopting a time-sharing duplex operation system and using a multi-carrier signal that uses M carriers of different center frequencies as a transmission modulation wave, wherein
  a transmission modulation wave with an N-th (N=1, . . . , M) carrier outputted from the N-th signal generator is amplified by the N-th power amplifier and transmitted from the N-th antenna element through the N-th transmission/reception changeover switch circuit, whereby transmission modulation waves with a total of M carriers including the first through M-th carriers are outputted from the respective M antenna elements.

Here, the time-sharing duplex operation system is a communication system in which transmission and reception are performed with one wave having the same frequency alternately used at intervals.

According to the radio communication device of the above-mentioned construction, the M antenna elements can generally be arranged so that the mutual electromagnetic coupling is reduced. Therefore, the M carrier transmission modulation waves transmitted from the M antenna elements are smoothly sent into the space without entering the other antennas through electromagnetic coupling. As a result, power combining can be achieved without causing any loss. Moreover, this is achieved without significantly increasing the number of parts and cost. Therefore, a radio communication terminal capable of achieving a great improvement in the efficiency of the power amplifier and having low power consumption can be provided. Moreover, the increase in the number of parts and cost can be minimized.

In one embodiment of the present invention, the M antenna elements have planes of polarization in directions mutually shifted roughly at 90 degrees.

By arranging the M antenna elements so that their planes of polarization are directed in directions mutually shifted roughly at 90 degrees, the electromagnetic coupling between the antenna elements becomes further reduced, and the power combining is effectively carried out in a loss-less manner.

In one embodiment of the present invention, diversity reception is carried out by the M antenna elements.

As is apparent from the above, according to the radio communication device of this invention, a small-sized low-cost circuit means capable of amplifying the power of the multi-carrier signal with high efficiency can be provided. With the above arrangement, the size reduction and weight reduction of the terminal can be achieved and a long-time telephone conversation can be achieved in, for example, the fourth generation portable telephone system that is expected to adopt the MC/DS-CDMA modulation wave.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the radio communication device of the present invention will be described more concretely in detail below with reference to the drawings.

The First Embodiment

Figure 1:
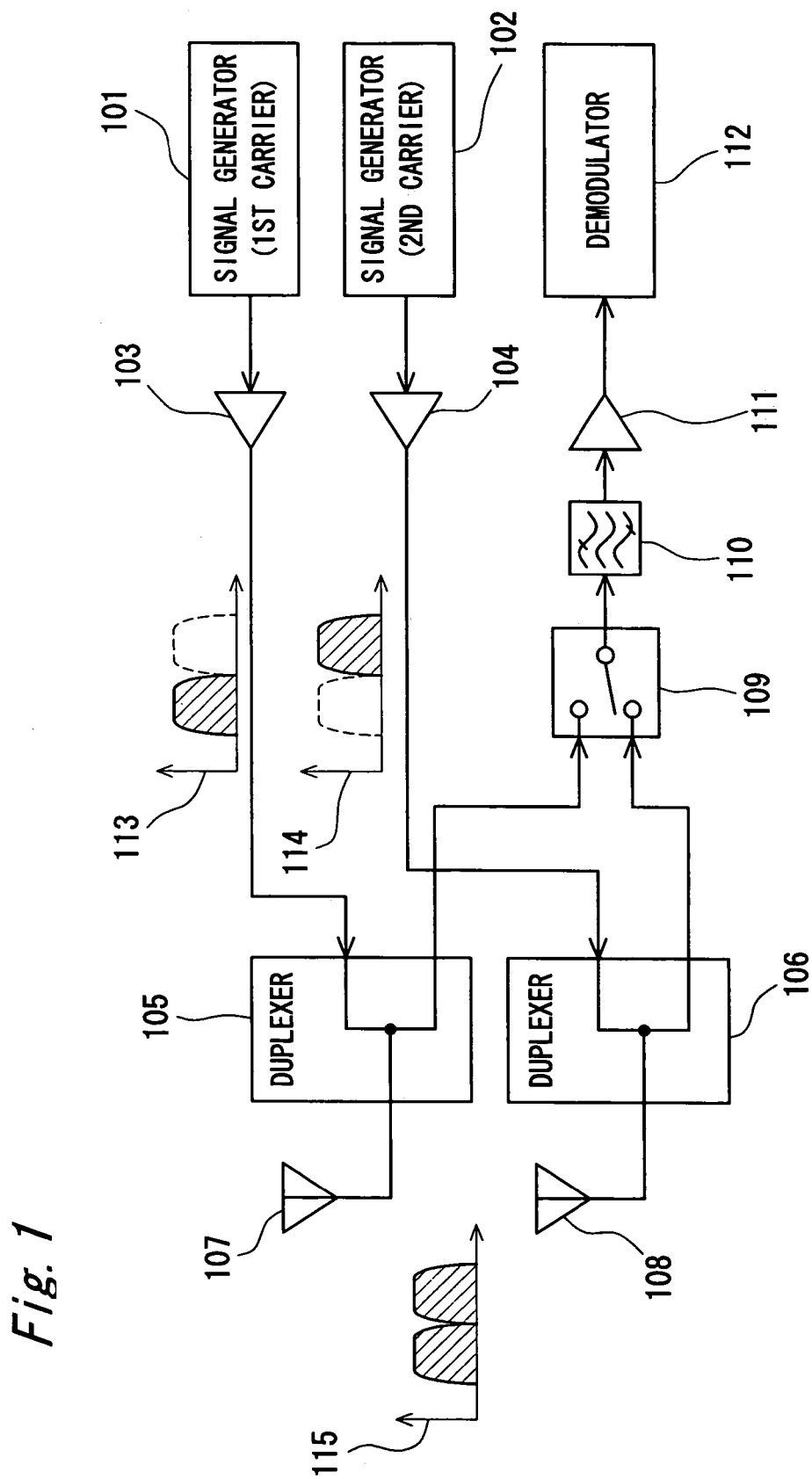
FIG. 1 is a block diagram of a radio communication device according to a first embodiment of the present invention.
Figure 5:
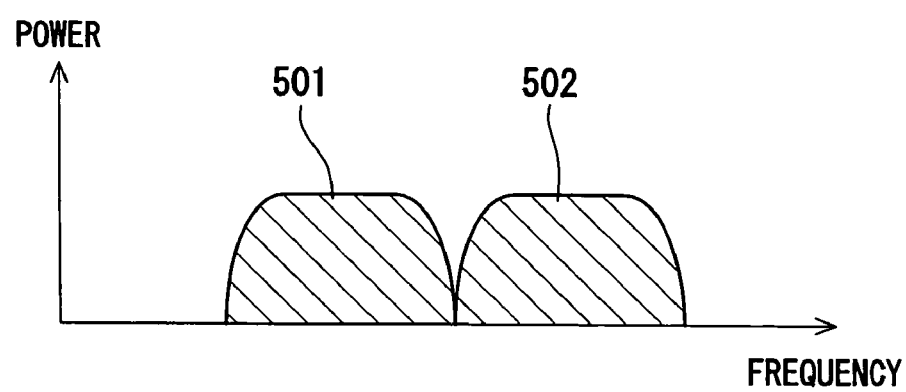
FIG. 5 is a schematic view of an objective multi-carrier signal of the present invention.

FIG. 1 is a schematic block diagram of the radio communication device of the first embodiment of the present invention. This first embodiment supposes a case where the transmission modulation wave is constructed of two carriers as shown in FIG. 5 and supposes a communication system that adopts the FDD (Frequency Division Duplex) system. As described hereinabove, the fourth generation portable telephone expected to adopt the MC/DS-CDMA system or the like corresponds to this.

In FIG. 1, a first carrier 501 of the modulation wave shown in FIG. 5 is generated by a first signal generator 101, amplified by a first signal generator 103 and transmitted from a first antenna element 107 through a first duplexer 105. On the other hand, a second carrier 502 of the modulation wave shown in FIG. 5 is generated by a second signal generator 102, amplified by a second power amplifier 104 and transmitted from a second antenna element 108 through a second duplexer 106. As a result, the two carrier components 501 and 502 are subjected to spatial power combining in an almost loss-less manner after being transmitted from the two antenna elements 107 and 108.

In order to supplement the description of the circuit operation of the aforementioned radio communication device, schematic spectrographic diagrams (113 through 115) obtained by simplifying FIG. 5 are illustrated in FIG. 1. An output spectrum 113 of the power amplifier 103 is a single carrier signal constructed of only the first carrier component 501 in FIG. 5. An output spectrum 114 of the power amplifier 104 is a single carrier signal constructed of only the second carrier component 502 in FIG. 5. A spectrum 115 after these signals have been subjected to spatial power combining through the two antenna elements 107 and 108 becomes the same multi-carrier signal as that of FIG. 5.

Figure 9:
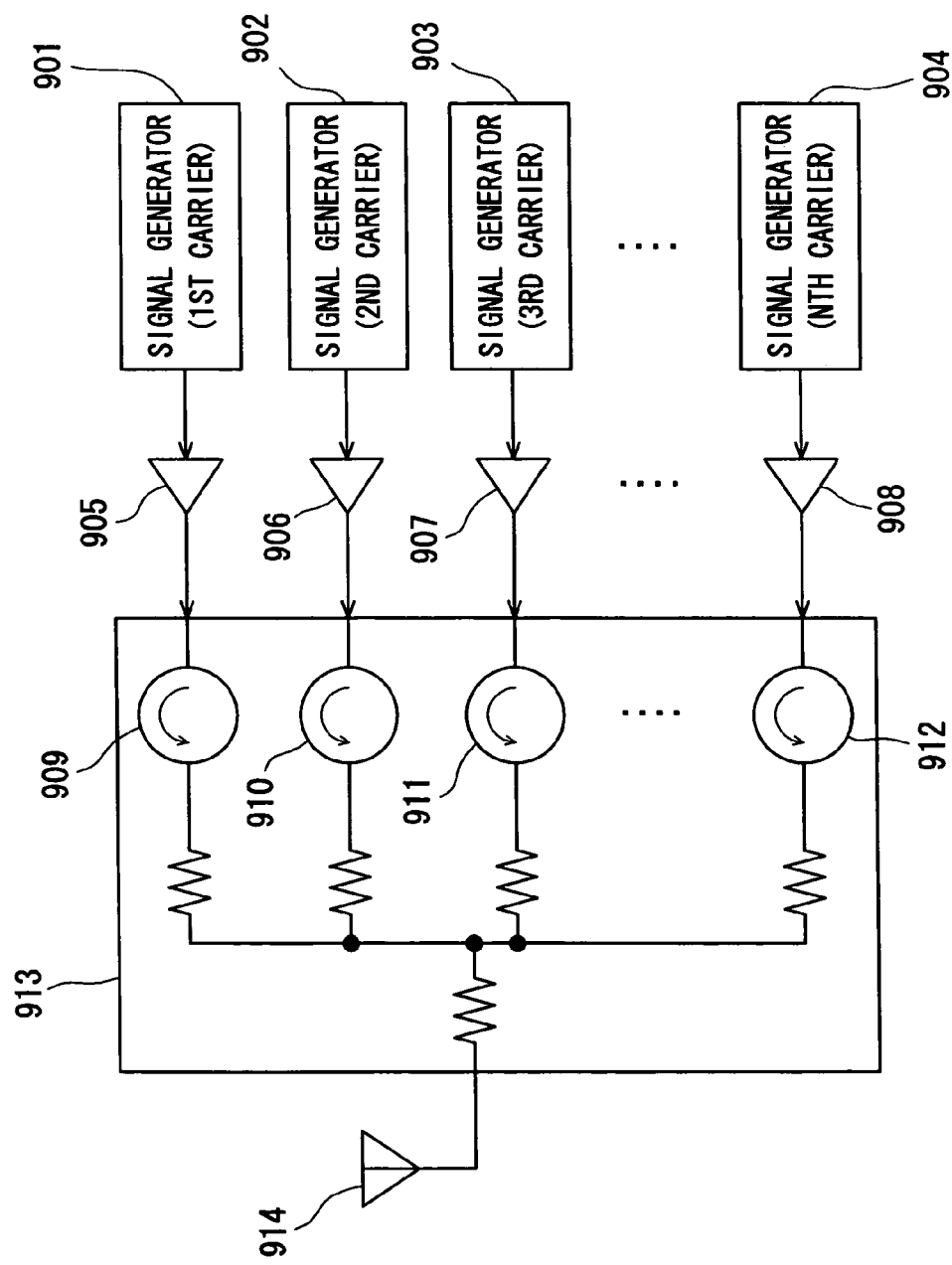
FIG. 9 is a block diagram of the transmission system of a prior art radio communication device (individual amplification system).

One of the essential factors of the present invention resides in that the two antenna elements 107 and 108 for individually transmitting the two carriers 501 and 502 in the transmission system are also used for diversity reception in the reception system. The antenna elements intended for diversity reception are arranged generally so that mutual electromagnetic coupling is reduced. For example, the antenna elements are arranged so that the planes of polarization are shifted roughly at 90 degrees to improve the polarization diversity effect. Therefore, the two carrier components 501 and 502 transmitted from the two antenna elements 107 and 108 are smoothly sent into the space without entering the other antenna through mutual electromagnetic coupling. As a result, a function, which corresponds to that of the power combiner 913 in FIG. 9, is achieved without causing any loss due to the resistance component or the like nor increasing the number of parts and cost.

The operation of the reception system in FIG. 1 will be described below. The essence of the reception system of this first embodiment resides in that the diversity reception using the two antenna elements 107 and 108 is adopted, and no further detail of the system for achieving the circuit is described. It is emphasized that the detail of the reception system in FIG. 1 is a mere example along with this essence.

A first reception signal that has passed through the first duplexer 105 from the first antenna element 107 and a second reception signal that has passed through the second duplexer 106 from the second antenna element 108 are subjected to selection so that the one in the better reception condition is selected by a diversity switch circuit 109, amplified by an LNA circuit 111 with its unnecessary frequency components removed by a filter circuit 110 and demodulated by a demodulator 112.

Figure 7:
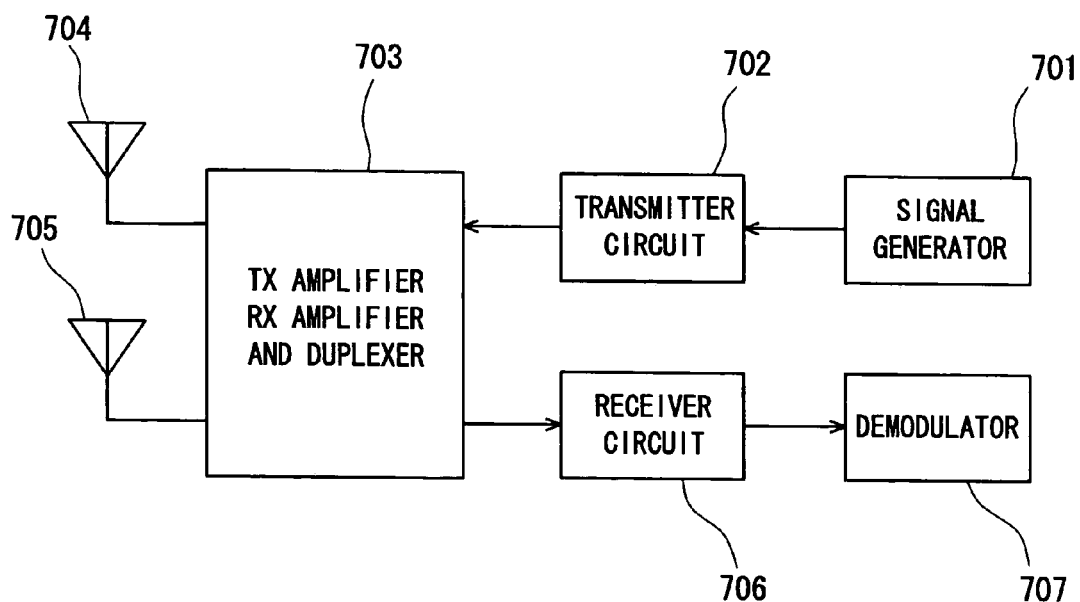
FIG. 7 is a block diagram of a prior art radio communication device.
Figure 8:
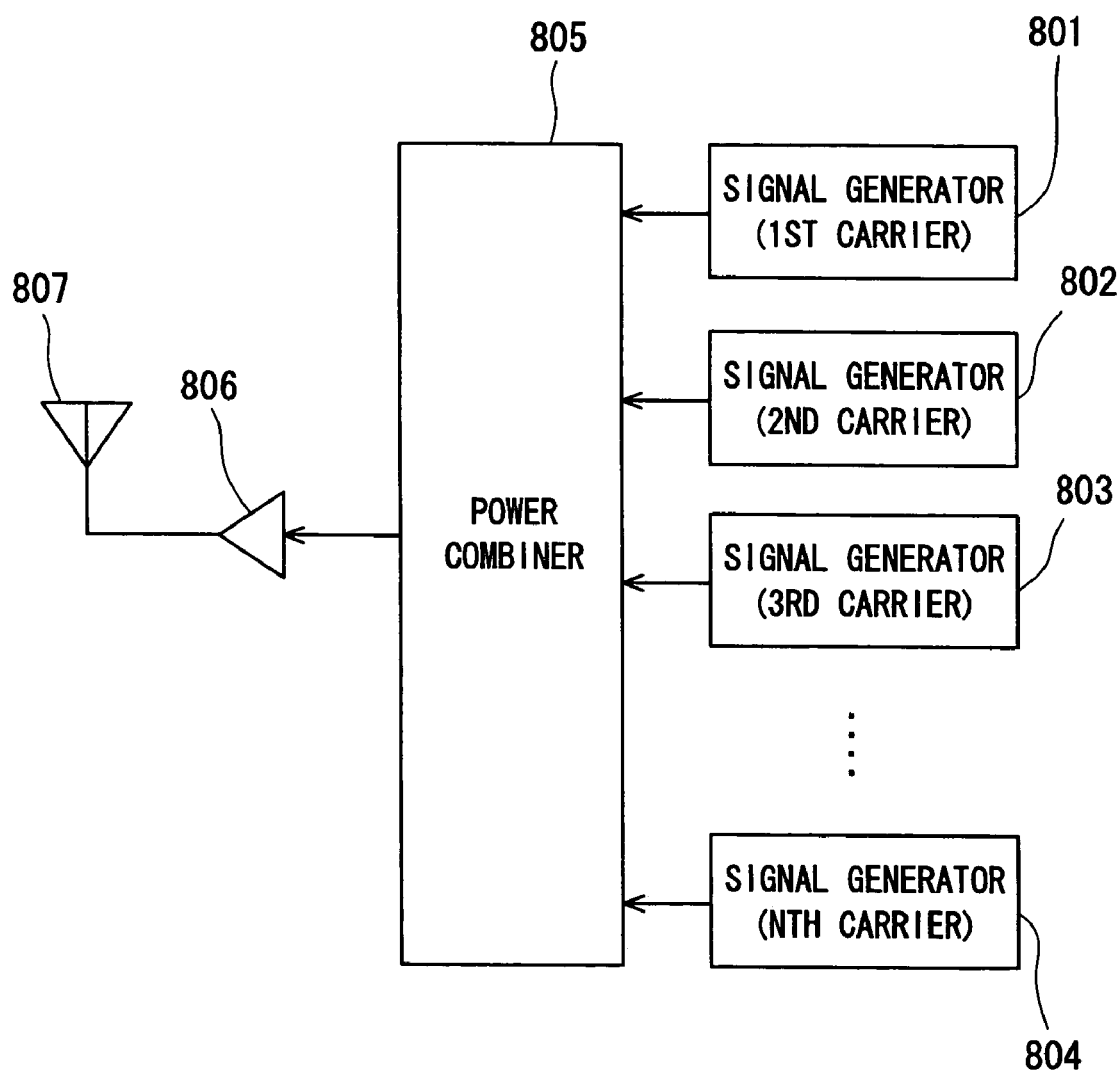
FIG. 8 is a block diagram of the transmission system of a prior art radio communication device (collective amplification system)

As described above, according to the radio communication device of the first embodiment, there can be provided a radio communication terminal, which is able to achieve a remarkable improvement in the efficiency of the power amplifier by the individual amplification system and the loss-less power combining and has a low power consumption. In the above case, the increases in the number of parts and the cost are reduced to a minimum, and in particular, the antenna elements, which are the parts of a remarkably large size among all the parts, are not required to be increased at all in comparison with the prior art (FIG. 7) that carries out diversity reception.

The Second Embodiment

Figure 2:
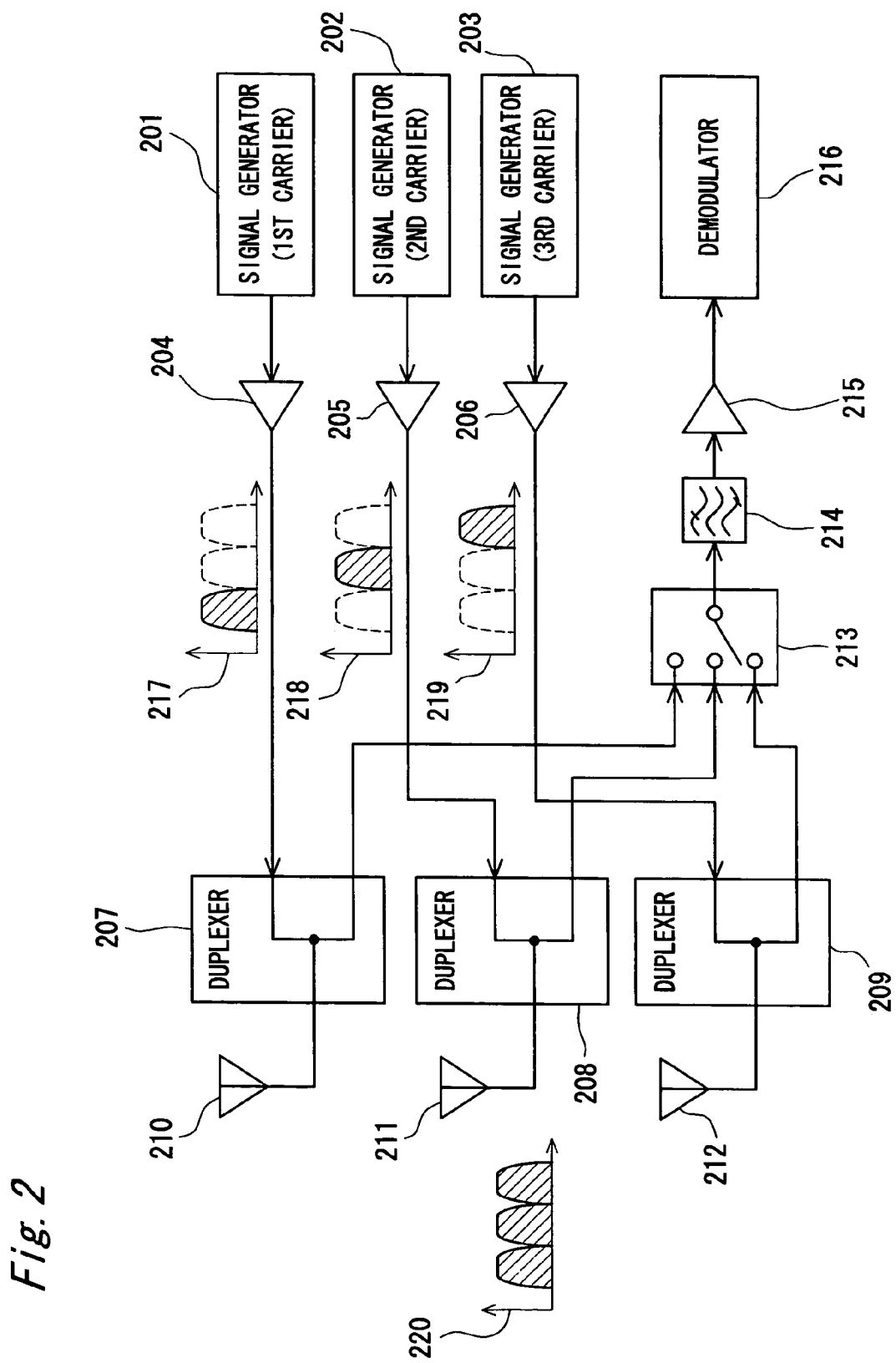
FIG. 2 is a block diagram of a radio communication device according to a second embodiment of the present invention.
Figure 6:
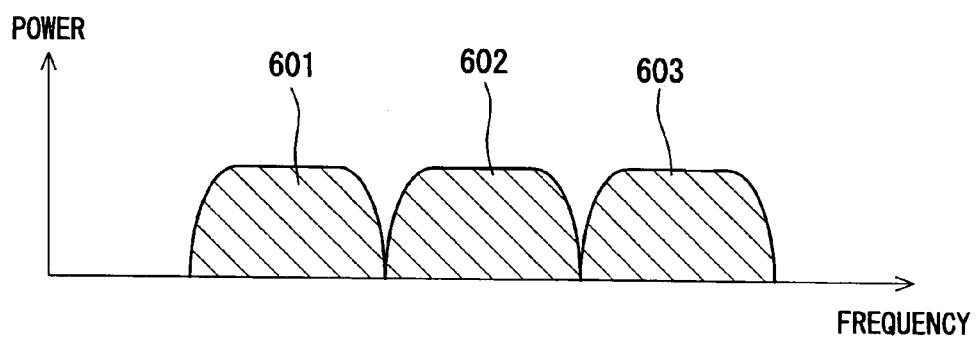
FIG. 6 is a schematic view of an objective multi-carrier signal of the present invention.

FIG. 2 is a schematic block diagram of the radio communication device of the second embodiment of the present invention. Although the radio communication device shown in FIG. 1 of the first embodiment has been the embodiment for the modulation wave of FIG. 5 that has used two carriers, the radio communication device shown in FIG. 2 of this second embodiment is expanded to cope with the modulation wave of FIG. 6 that uses three carriers. In FIG. 6, three modulation waves 601, 602 and 603 with first through third carriers are adjacently arranged on the frequency axis.

A first carrier 601 of the modulation wave shown in FIG. 6 is generated by a first signal generator 201, amplified by a first power amplifier 204 and transmitted from a first antenna element 210 through a first duplexer 207. A second carrier 602 of the modulation wave shown in FIG. 6 is generated by a second signal generator 202, amplified by a second power amplifier 205 and transmitted from a second antenna element 211 through a second duplexer 208. Further, a third carrier 603 of the modulation wave shown in FIG. 6 is generated by a third signal generator 203, amplified by a third power amplifier 206 and transmitted from a third antenna element 212 through a third duplexer 209. As a result, the three carrier components 601, 602 and 603 are subjected to spatial power combining in an almost loss-less manner after being transmitted from the three antenna elements 210, 211 and 212.

In order to supplement the description of the circuit operation of the aforementioned radio communication device, schematic spectrographic diagrams (217 through 220) obtained by simplifying FIG. 6 are illustrated in FIG. 2. An output spectrum 217 of the power amplifier 204 is a single carrier signal constructed of only the first carrier component 601 in FIG. 6. An output spectrum 218 of the power amplifier 205 is a single carrier signal constructed of only the second carrier component 602 in FIG. 6. An output spectrum 219 of the power amplifier 206 is a single carrier signal constructed of only the third carrier component 603 in FIG. 6. A spectrum 220 after these signals have been subjected to spatial power combining through the three antenna elements 210 through 212 becomes the same multi-carrier signal as that of FIG. 6.

In the reception system, a first reception signal that has passed through the first duplexer 207 from the first antenna element 210, a second reception signal that has passed through the second duplexer 208 from the second antenna element 211 and a third reception signal that has passed through the third duplexer 209 from the third antenna element 212 are subjected to selection so that the one in the best reception condition is selected by a diversity switch circuit 213, amplified by an LNA circuit 215 with its unnecessary frequency components removed by a filter circuit 214 and demodulated by a demodulator 216.

Figure 4:
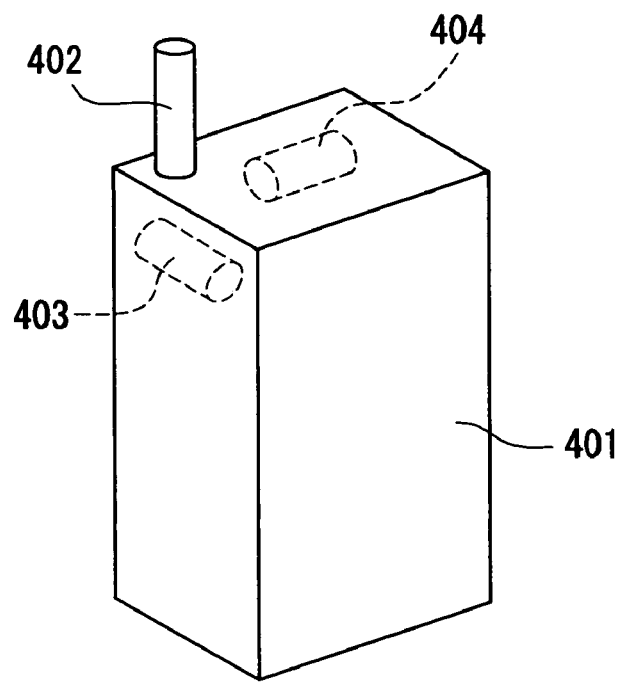
FIG. 4 is a schematic view of the arrangement of the antenna elements of the radio communication device of the present invention.

The aforementioned three antenna elements, which are intended for the diversity reception, are arranged so that mutual electromagnetic coupling becomes reduced. As an example, FIG. 4 shows a case where three rod type antennas are made to have a polarization diversity effect in a portable telephone. In FIG. 4, one external rod type antenna 402 of a casing 401 of the portable telephone and two rod type antennas 403 and 404 concealed in the casing 401 are arranged in directions three-dimensionally mutually shifted roughly at 90 degrees. Therefore, the three antennas 402, 403 and 404 come to have planes of polarization mutually shifted roughly at 90 degrees, and the mutual electromagnetic coupling is reduced.

As described above, according to the radio communication device of the second embodiment, there can be provided a radio communication terminal, which is able to achieve a remarkable improvement in the efficiency of the power amplifier by the individual amplification system and the loss-less power combining and has a low power consumption. In the above case, the increases in the number of parts and the cost are reduced to a minimum, and in particular, the antenna elements, which are the parts of a remarkably large size among all the parts, are not required to be increased at all in comparison with the prior art that carries out diversity reception.

The Third Embodiment

Figure 3:
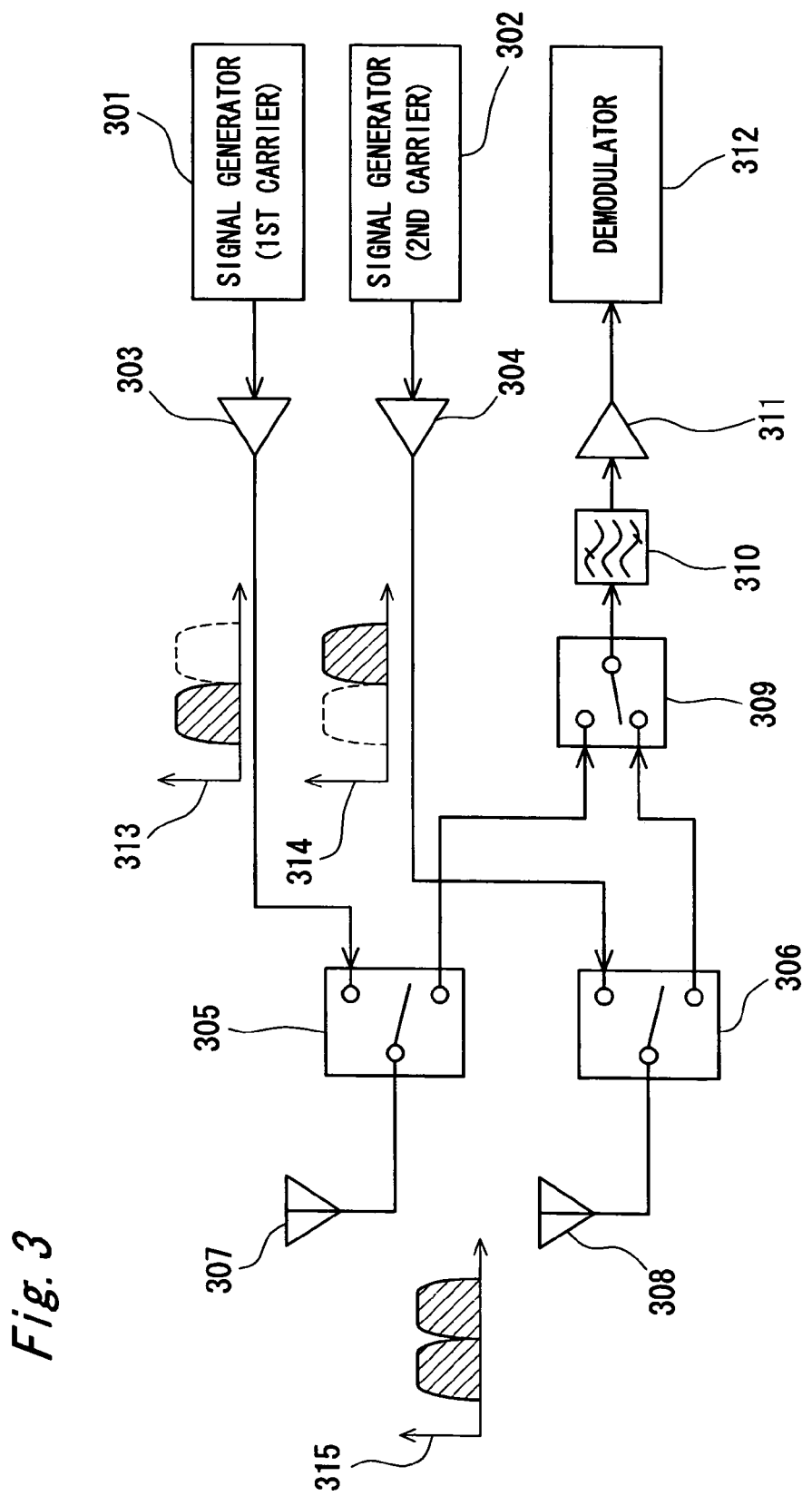
FIG. 3 is a block diagram of a radio communication device according to a third embodiment of the present invention.

FIG. 3 is a schematic block diagram of the radio communication device of the third embodiment of the present invention. In contrast to the radio communication device of FIG. 1 of the first embodiment, which has been a communication system that has adopted the FDD (Frequency Division Duplex) system, the radio communication device shown in FIG. 3 of this third embodiment is a communication system that adopts the TDD (Time Division Duplex) system. The modulation wave is supposed to be of the spectrum shown in the schematic view of FIG. 5 similarly to the case of FIG. 1.

A first carrier 501 of the modulation wave shown in FIG. 5 is generated by a first signal generator 301, amplified by a first power amplifier 303 and transmitted from a first antenna element 307 through a first transmission/reception changeover switch circuit 305. A second carrier 502 of the modulation wave shown in FIG. 5 is generated by a second signal generator 302, amplified by a second power amplifier 304 and transmitted from a second antenna element 308 through a second transmission/reception changeover switch circuit 306. As a result, the two carrier components 501 and 502 are subjected to spatial power combining in an almost loss-less manner after being transmitted from the two antenna elements 307 and 308.

In order to supplement the description of the circuit operation of the above-mentioned radio communication device, schematic spectrographic diagrams (313 through 315) obtained by simplifying FIG. 5 are illustrated in FIG. 3. An output spectrum 313 of the power amplifier 303 is a single carrier signal constructed of only the first carrier component 501 in FIG. 5. An output spectrum 314 of the power amplifier 304 is a single carrier signal constructed of only the second carrier component 502 in FIG. 5. A spectrum 315 after these signals have been subjected to spatial power combining through the two antenna elements 307 and 308 becomes the same multi-carrier signal as that of FIG. 5.

In the reception system, a first reception signal that has passed through the first transmission/reception changeover switch circuit 305 from the first antenna element 307 and a second reception signal that has passed through the second transmission/reception changeover switch circuit 306 from the second antenna element 308 are subjected to selection so that the one in the better reception condition is selected by a diversity switch circuit 309, amplified by an LNA circuit 311 with its unnecessary frequency components removed by a filter circuit 310 and demodulated by a demodulator 312.

As described above, the efficiency of the power amplifier can be increased with the number of parts and the cost suppressed to a minimum also in the TDD system similar to the FDD system. That is, a radio communication terminal of low power consumption can be provided.

In the first through third embodiments, the radio communication devices, in which the multi-carrier signal that uses two or three carriers of different center frequencies have served as the transmission modulation waves, have been described. However, it is acceptable to apply this invention to a radio communication device in which a multi-carrier signal that uses four or more carriers of different center frequencies as the transmission modulation waves.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A radio communication device, comprising:
    M (M: natural number being not smaller than two) antenna elements;
    M signal generators;
    M power amplifiers; and
    M duplexers, the radio communication device adopting a frequency division duplex operation system and using a multi-carrier signal that uses M carriers of different center frequencies as a transmission modulation wave, wherein
    a transmission modulation wave with an N-th (N =1, . . . , M) carrier outputted from the N-th signal generator is amplified by the N-th power amplifier and transmitted from the N-th antenna element through the N-th duplexer, whereby transmission modulation waves with a total of M carriers including the first through M-th carriers are outputted from the respective M antenna elements,
    wherein diversity reception is also carried out by the M antenna elements.

2. The radio communication device as claimed in claim 1, wherein
    the M antenna elements have planes of polarization in directions mutually shifted roughly at 90 degrees.

3. The radio communication device as claimed in claim 1, wherein the transmission modulation waves are subjected to spatial power combining after being transmitted from the M antenna elements.

4. A radio communication device, comprising
    M (M: natural number being not smaller than two) antenna elements;
    M signal generators;
    M power amplifiers; and
    M transmission/reception changeover switch circuits, the radio communication device adopting a time-sharing duplex operation system and using a multi-carrier signal that uses M carriers of different center frequencies as a transmission modulation wave, wherein
    a transmission modulation wave with an N-th (N=1, . . . , M) carrier outputted from the N-th signal generator is amplified by the N-th power amplifier and transmitted from the N-th antenna element through the N-th transmission/reception changeover switch circuit, whereby transmission modulation waves with a total of M carriers including the first through M-th carriers are outputted from the respective M antenna elements,
    wherein diversity reception is also carried out by the M antenna elements.

5. The radio communication device as claimed in claim 4, wherein
    the M antenna elements have planes of polarization in directions mutually shifted roughly at 90 degrees.

6. The radio communication device as claimed in claim 4, wherein the transmission modulation waves are subjected to spatial power combining after being transmitted from the M antenna elements.

* * * * *